(12) United States Patent
Yonezawa et al.

(10) Patent No.: US 7,793,924 B2
(45) Date of Patent: Sep. 14, 2010

(54) POSITIONING DEVICE AND CLAMPING SYSTEM WITH THE DEVICE

(75) Inventors: Keitaro Yonezawa, Kobe (JP); Yosuke Haruna, Kobe (JP)

(73) Assignee: Kosmek Ltd., Kobe-Shi, Hyogo ( * ) Notice: Subject to any disclaimer, the term of this patent is extended or adjusted under 35 U.S.C. 154(b) by 521 days.

(21) Appl. No.: 10/572,576

(22) PCT Filed: Sep. 21, 2004

(86) PCT No.: PCT/JP2004/013736
§ 371 (c)(1),
(2), (4) Date: Mar. 17, 2006

(87) PCT Pub. No.: WO2005/035186
PCT Pub. Date: Apr. 21, 2005

(65) Prior Publication Data
US 2006/0279034 A1    Dec. 14, 2006

(30) Foreign Application Priority Data
Oct. 9, 2003    (JP) .............................. 2003-350331

(51) Int. Cl.
*B23Q 3/00* (2006.01)
(52) U.S. Cl. ........................................ 269/309; 269/310
(58) Field of Classification Search .......... 269/309–310
See application file for complete search history.

(56) References Cited

U.S. PATENT DOCUMENTS

| 6,095,509 A | * | 8/2000 | Yonezawa ............... 269/309 |
| 6,604,738 B2 | * | 8/2003 | Haruna ................... 269/309 |
| 2004/0207141 A1 | | 10/2004 | Kuroda |
| 2006/0279034 A1 | * | 12/2006 | Yonezawa et al. ......... 269/309 |

FOREIGN PATENT DOCUMENTS

| JP | 57-27640 | 2/1982 |
| JP | 2003-260624 | 9/2003 |

* cited by examiner

*Primary Examiner*—Lee D Wilson
(74) *Attorney, Agent, or Firm*—Bacon & Thomas, PLLC

(57) ABSTRACT

A plug member (12) inserted into a positioning hole (5) formed in a second block (2) is projected from a first block. Two slide portions (61, 61) opposed to each other across the plug member (12) are arranged around the plug member (12) movably in a first radial direction (D1) substantially orthogonal to the opposed direction. An annular pressing member (15) which is allowed to diametrically expand and diametrically contract is arranged around an outer periphery of the slide portion (61, 61). The slide portions (61, 61) diametrically expand the pressing member (15) in a second radial direction (D2) which is the opposed direction by a drive device to press the pressing member (15) against an inner peripheral surface of the positioning hole (5), by which the slide portions (61, 61) are moved in the first radial direction (D1) with respect to the plug member (12).

14 Claims, 14 Drawing Sheets

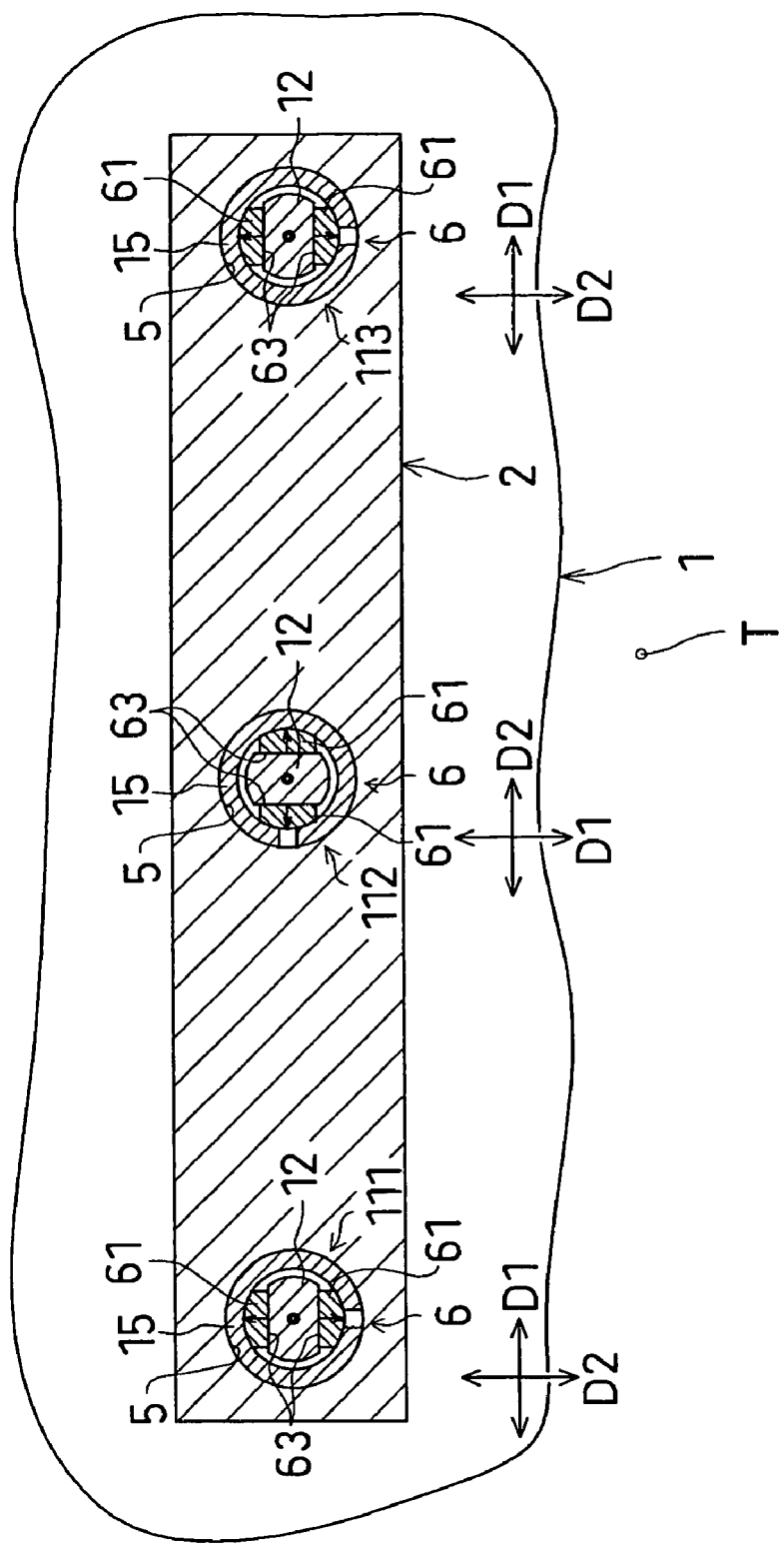

POSITIONING DEVICE AND CLAMPING SYSTEM WITH THE DEVICE

TECHNICAL FIELD

The present invention relates to an apparatus for positioning a second block such as a work pallet with respect to a first block such as a table of a machine tool. The invention also relates to a clamping system equipped with the positioning apparatus.

BACKGROUND OF THE INVENTION

Such a positioning apparatus is in general conventionally constructed so as to fit a plug projected from a support surface of a reference member (first block) into a circular positioning hole opened on a supported surface of a movable member (second block) (for example, refer to the following Patent Document 1).

Patent Document 1: Japanese Unexamined Patent Publication No. 57-27640

SUMMARY OF THE INVENTION

Problem to be Solved by the Invention

In the above-described prior art, it is necessary to provide a predetermined fitting gap between the positioning hole and the plug in order to attain a smooth fitting of them. Thereby, the gap will result in a decreased positioning accuracy.

The present invention has been made in view of the above problem, it is an object of the present invention to provide a positioning apparatus capable of positioning with high accuracy.

MEANS FOR SOLVING THE PROBLEM AND EFFECT

The problem to be solved by the present invention is as described above. Next, an explanation will be made for the means for solving the problem and the effect.

(First Invention)

Specifically, the positioning apparatus of a first invention is constructed as follows, as illustrated, for example, in FIG. 1 through FIG. 3, FIG. 9, or FIG. 10 and FIG. 11.

A plug member 12 inserted into a positioning hole 5 formed in a second block 2 is projected from a first block 1. A plurality of slide portions 61, 61 opposed to each other across the plug member 12 are arranged around the plug member 12 movably in a first radial direction D1 substantially orthogonal to the opposed direction of the slide portions 61, 61. An annular pressing member 15 which is allowed to diametrically expand and diametrically contract is arranged around an outer periphery of the slide portions 61, 61. The slide portions 61, 61 diametrically expand the pressing member 15 in a second radial direction D2 which is the opposed direction by a drive means D to press the pressing member 15 against an inner peripheral surface of the positioning hole 5, whereby the slide portions 61, 61 are moved in the first radial direction D1 with respect to the plug member 12.

With this structure, after the pressing member 15 is inserted into the positioning hole 5, the fitting gap G (for example, refer to FIG. 4 and FIG. 5) is eliminated by the drive means D, by which the pressing member 15 is allowed to be positioned. Therefore, the pressing member is smoothly inserted into the positioning hole and also positioned with high accuracy. Further, the pressing member is allowed to be positioned with high accuracy in the second radial direction, and positional misalignment of the positioning hole to the plug member in the first radial direction may be allowed, because the slide portions slide in the first radial direction.

(Second Invention)

In the first invention, it is preferable to provide the following construction, for example, as illustrated in FIG. 1 through FIG. 3 or FIG. 9.

Inclined outer surfaces 13, 13 which get closer to an axis of the plug member 12 toward a leading end are formed on an outer surfaces of the slide portions 61, 61. An inclined inner surface 17 which is allowed to make a tapering engagement with the inclined outer surfaces 13, 13 is formed on the pressing member 15. A drive member 21 is inserted into the plug member 12 axially movably, and the drive member 21 is connected to the pressing member 15. The pressing member 15 is moved toward a base end for locking via the drive member 21 so as to expand the pressing member 15 in the second radial direction D2 by the tapering engagement and bring the pressing member 15 into close contact with the inner peripheral surface of the positioning hole 5. The pressing member 15 is moved toward the leading end for releasing via the drive member 21 so as to cancel the expanded condition of the pressing member 15 and cancel the closely contacted condition of the pressing member 15.

With this structure, it is possible to position the second block with respect to the first block in the second radial direction reliably and strongly by the diametrically expanding force derived from the tapering engagement. Further, when the drive member is driven to move the pressing member for locking, the second block is allowed to be pressed against the first block via the pressing member, thereby omitting an exclusive clamp means.

(Third Invention)

In the first invention, it is preferable to provide the following construction, for example, as illustrated in FIG. 10 and FIG. 11.

Inclined outer surfaces 64, 64 which get closer to an axis of the plug member 12 toward a leading end and oppose each other in the second radial direction D2 are formed on the plug member 12. The slide portions 61, 61 are allowed to make a tapering engagement with the inclined outer surfaces 64, 64 from the leading end side. A drive member 21 is inserted into the plug member 12 axially movably, and the drive member 21 is connected to the slide portions 61, 61. The slide portions 61, 61 are moved toward a base end for locking via the drive member 21 so as to diametrically expand the pressing member 15 in the second radial direction D2 by the tapering engagement and bring the pressing member 15 into close contact with the inner peripheral surface of the positioning hole 5. The slide portions 61, 61 are moved toward the leading end for releasing via the drive member 21 so as to cancel the expanded condition of the pressing member 15 and cancel the closely contacted condition of the pressing member 15.

With this structure, the second block is allowed to be strongly and reliably positioned with respect to the first block in the second radial direction by the diametrically expanding force derived from the tapering engagement.

(Fourth Invention)

In the first invention, it is preferable that the pressing member 15 is formed into an annular shape, for example, as illustrated in FIG. 1 through FIG. 3, FIG. 9, FIG. 10 and FIG. 11.

With this structure, it is structurally possible to prevent intrusion of foreign matter inside the pressing member and also avoid troubles on the positioning apparatus resulting from foreign matter.

(Fifth Invention)

In the fourth invention, it is preferable that gaps A, A are formed between the pressing member 15 and the plug member 12 in the first radial direction D1, for example, as illustrated in FIG. 1 through FIG. 3, FIG. 9, FIG. 10 and FIG. 11.

With this structure, the pressing member is allowed to move in the first radial direction, thereby making it possible to easily follow positional misalignment in the first radial direction occurring between the positioning hole and the plug member.

(Sixth Invention)

In the fourth invention, it is preferable that a slit 51 is formed in the pressing member 15 to allow the pressing member 15 to deform in a diametrically expanding direction and a diametrically contracting direction, for example, as illustrated in FIG. 1 through FIG. 3, or FIG. 9.

With this structure, such a mechanically simple construction is provided that the pressing member is allowed to be deformed in a diametrically expanding direction and a diametrically contracting direction. Further, the pressing member is allowed to be deformed to a greater range in a radial direction, thereby making the fitting gap larger to smoothly insert the pressing member into the positioning hole.

(Seventh Invention)

In the fourth invention, it is preferable that the pressing member 15 is formed in an annularly seamless manner, for example, as illustrated in FIG. 10 and FIG. 11.

With this structure, it is structurally possible to prevent more effectively intrusion of foreign matter inside the pressing member and also avoid troubles on the positioning apparatus resulting from foreign matter more reliably.

(Eighth Invention)

In the seventh invention, it is preferable to provide the following construction, for example, as illustrated in FIG. 12.

Two contact portions 61a, 61a allowed to come into contact with an inner surface of the pressing member 15 and an escape portion 61b arranged between the two contact portions 61a, 61a are formed on an outer surface of each of the slide portions 61, 61 circumferentially side by side. A gap B is formed between the escape portion 61b and the pressing member 15.

With this structure, the pressing member 15 is allowed to be positioned appropriately, even in a case where the positioning hole 5 has a larger inner diameter and the pressing member 15 is required to undergo a great displacement and deformation so as to come into close contact with the inner peripheral surface of the positioning hole 5. Specifically, the present embodiment is constructed in such a way that the pressing member 15 is pushed at two contact portions 61a, 61a for each of the slide portions 61, 61 or a total of four contact portions, but the pressing member 15 is not pushed at the escape portion 61b. Therefore, the pressing member deforms appropriately along the inner peripheral surface of the positioning hole having a large diameter so as to come into close contact therewith, applying a diametrically expanding force (force in the second radial direction) at the four points of the contact portions, thereby making it possible to correct positional misalignment in the second radial direction occurring between the positioning hole and the plug member appropriately and reliably.

(Ninth Invention)

The positioning apparatus of a ninth invention is provided with the following constructing, for example, as illustrated in FIG. 14 and FIG. 15.

A plug member 12 inserted into a positioning hole 5 formed in a second block 2 is projected from a first block 1. A plurality of slide portions 61, 61 opposed to each other across the plug member 12 are arranged around the plug member 12 movably in a first radial direction D1 substantially orthogonal to the opposed direction of the slide portions 61, 61 and are allowed to diametrically expand and diametrically contract in a second radial direction D2 which is the opposed direction. The slide portions 61, 61 are diametrically expanded in the second radial direction D2 by a drive means D to press the slide portions 61, 61 against a peripheral surface of the positioning hole 5, whereby the slide portions 61, 61 are moved in the first radial direction D1 with respect to the plug member 12.

With this structure, after the slide portions 61, 61 are inserted into the positioning hole 5, the fitting gap G is eliminated by the drive means D, by which the slide portions 61, 61 are allowed to be positioned. Therefore, the slide portions can be smoothly inserted into the positioning hole and also positioned with high accuracy. Further, the slide portions 61, 61 are also allowed to be positioned with high accuracy in the second radial direction, and positional misalignment of the positioning hole to the plug member in the first radial direction may be allowed, because the slide portions slide in the first radial direction.

(Tenth Invention)

In the ninth invention, it is preferable to provide the following construction, for example, as illustrated in FIG. 14 and FIG. 15.

Inclined outer surfaces 64, 64 which get closer to an axis of the plug member 12 toward a leading end and oppose each other in the second radial direction D2 are formed on the plug member 12. A cylindrical connecting member 81 is arranged around an outer periphery of the plug member 12. The slide portions 61, 61 are supported on the connecting member 81 movably in the second radial direction D2 and are allowed to make a tapering engagement with the inclined outer surfaces 64, 64 from the leading end side. A drive member 21 is inserted into the plug member 12 axially movably, and the drive member 21 is connected to the connecting member 81. The slide portions 61, 61 are moved toward a base end for locking via the drive member 21 so as to expand the slide portions 61, 61 in the second radial direction D2 by the tapering engagement and bring the slide portions 61, 61 into close contact with an inner peripheral surface of the positioning hole 5. The slide portions 61, 61 are moved toward the leading end for releasing via the drive member 21 so as to cancel the expanded condition of the slide portions 61, 61 and cancel the closely contacted condition of the slide portions 61, 61.

With this structure, it is possible to position the second block with respect to the first block in the second radial direction reliably and strongly by the diametrically expanding force derived from the tapering engagement. Further, when the drive member is driven to move the slide portions for locking, the second block is allowed to be pressed against the first block via the slide portions, thereby omitting an exclusive clamp means.

(Eleventh Invention)

In the tenth invention, it is preferable that an urging member 84 is provided, which applies resilient force against the slide portions 61, 61 in a diametrically contracting direction, for example, as illustrated in FIG. 14 and FIG. 15.

With this structure, when the slide portions are moved to the leading end for releasing, the slide portions are allowed to displace in the diametrically contracting direction by an urging force of the urging member, thereby making it possible to easily cancel the closely contacted condition of the slide portions with the inner peripheral surface of the positioning hole.

(Twelfth Invention)

In the ninth invention, it is preferable to provide the following construction, for example, as illustrated in FIG. 17.

Two contact portions 61a, 61a and an escape portion 61b arranged between the two contact portions 61a, 61a are formed on an outer surface of each of the slide portions 61, 61 circumferentially side by side. When the contact portions 61a, 61a come into contact with an inner peripheral surface of the positioning hole 5, a gap B is formed between the escape portion 61b and the inner peripheral surface of the positioning hole 5.

With this structure, the slide portions 61, 61 are allowed to be appropriately positioned, even in a case where the positioning hole 5 has a larger inner diameter and the slide portions 61, 61 are required to undergo a great displacement so as to come into close contact with the inner peripheral surface of the positioning hole 5. Specifically, the present embodiment is constructed in such a way that the inner peripheral surface of the positioning hole 5 is pushed at two contact portions 61a, 61a for each of the slide portions 61, 61 or a total of four contact portions 61a, 61a, but the inner peripheral surface of the positioning hole 5 is not pushed at the escape portion 61b. Therefore, the diametrically expanding force (force in the second radial direction) is applied at the four points of the contact portions, thereby making it possible to correct positional misalignment in the second radial direction occurring between the positioning hole and the plug member appropriately and reliably.

(Thirteenth Invention)

The clamping system of the present invention is provided with the positioning apparatus of the first invention or the ninth invention, for example, as illustrated in FIG. 18 or FIG. 19.

With this structure, workability when attaching or detaching the first block and the second block is excellent, and positioning with high accuracy can be conducted.

(Fourteenth Invention)

The clamping system of the present invention is provided with a plurality of positioning apparatuses and at least one of them is the positioning apparatus of the first invention or the ninth invention, for example, as illustrated in FIG. 18 or FIG. 19.

With this structure, the first block and the second block are attached thereto or detached therefrom favorably and positioned with high accuracy. Further, a clamping system is provided, which can conduct positioning in various modes.

BRIEF DESCRIPTION OF THE DRAWINGS

FIG. 19 is a schematic view of a plan sectional view illustrating a second example of the clamping system.

DESCRIPTION OF REFERENCE NUMERALS

Figure 1:
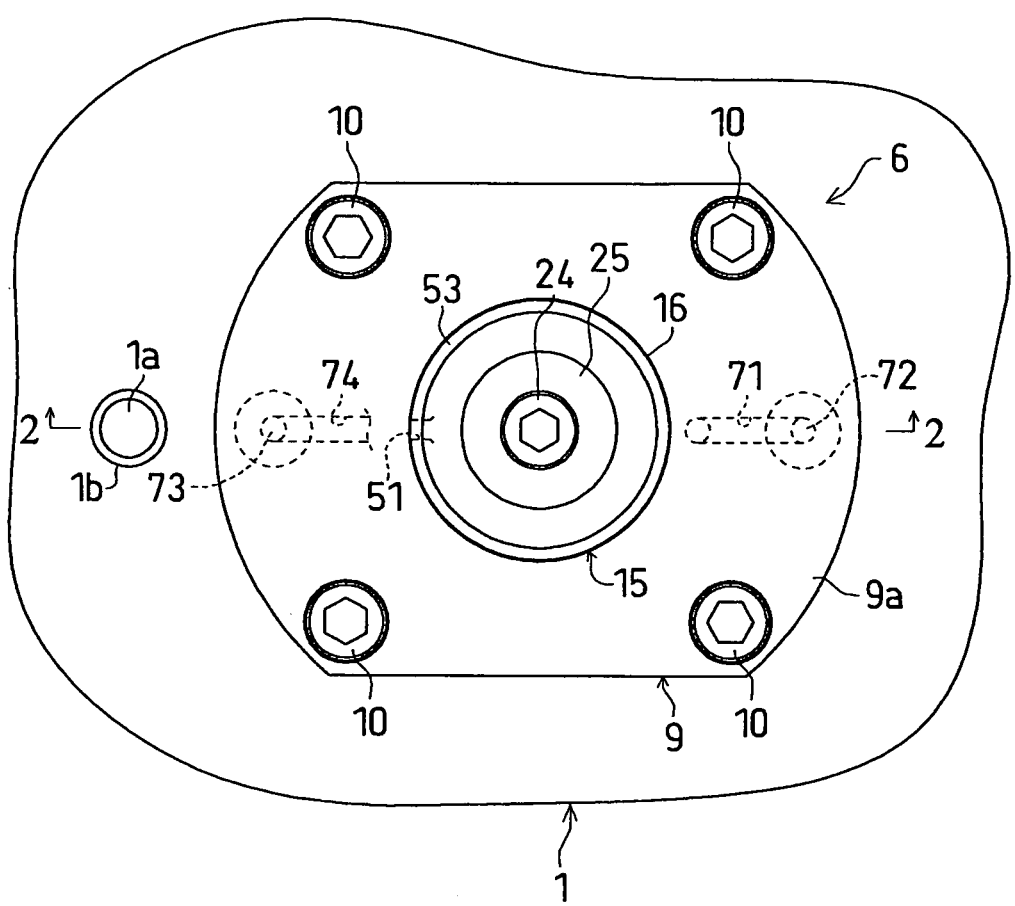
FIG. 1 is a plan view illustrating a plug means of a positioning apparatus of a first embodiment of the present invention.

1: base plate (first block)
2: work pallet (second block)
5: positioning hole
12: plug member
13: inclined outer surface
15: sleeve member (pressing member)
17: inclined inner surface
21: drive member
61, 61: slide portion
63, 63: slide surface
D1: first radial direction
D2: second radial direction

BEST MODE FOR CARRYING OUT THE INVENTION

First Embodiment

FIG. 1 through FIG. 7 illustrate a first embodiment of the present invention.

Figure 2:
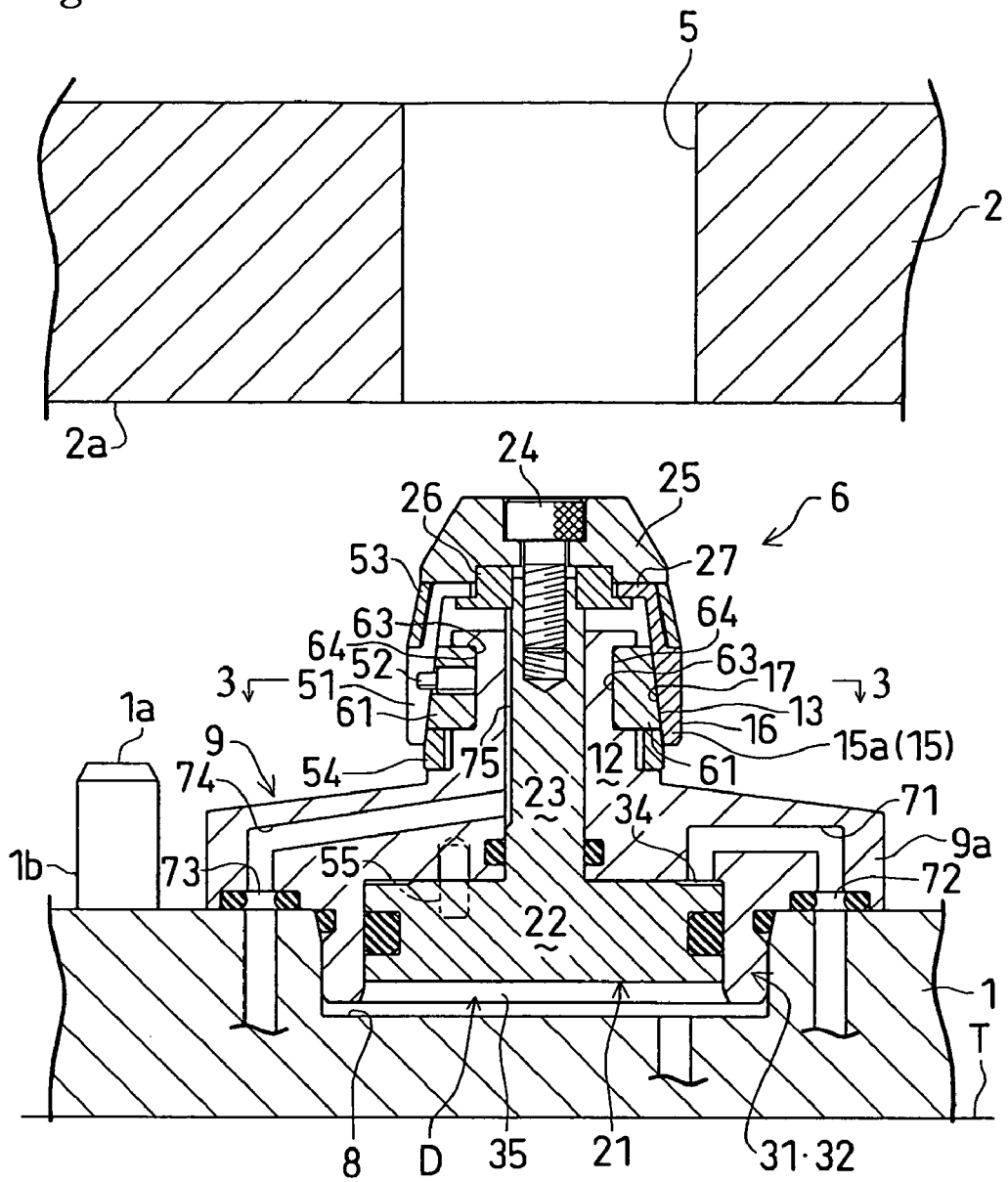
FIG. 2 is across sectional view indicated by the arrow 2-2 in FIG. 1.
Figure 3:
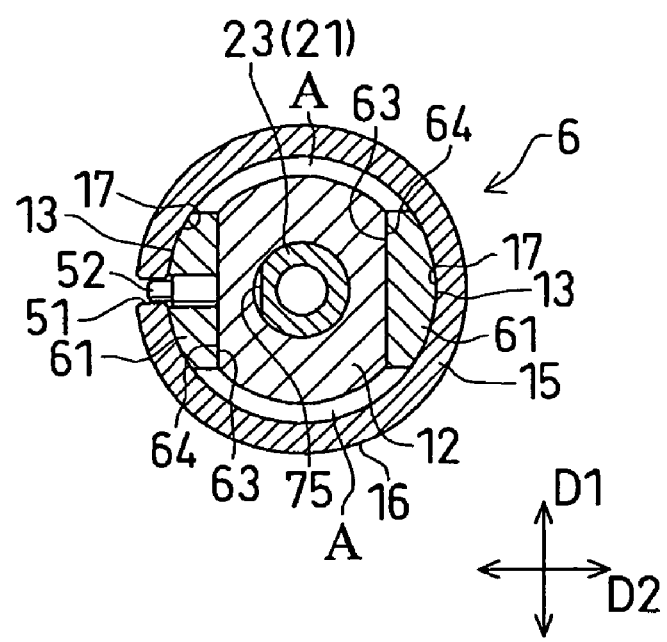
FIG. 3 is across sectional view indicated by the arrow 3-3 in FIG. 2.

First, an explanation will be made for a whole structure of the positioning apparatus of the present invention by referring to FIG. 1 through FIG. 3. FIG. 1 is a plan view of a plug means of the positioning apparatus. FIG. 2 is a cross sectional view indicated by the arrow 2-2 in FIG. 1. FIG. 3 is a cross sectional view indicated by the arrow 3-3 in FIG. 2.

In the present embodiment, as illustrated in FIG. 2, on a table T of a machine tool is placed a base plate 1 as a first block. On the base plate 1 are projected a plurality of bosses 1b (here, only one boss 1b is illustrated), and on an upper end surface of the boss 1b is formed a flat support surface 1a. The positioning apparatus of the present embodiment is constructed in such a way that a supported surface 2a of a work pallet 2 as a second block is received on the support surface 1a of the base plate 1 and the work pallet 2 is positioned with respect to the base plate 1.

In the work pallet 2 is opened a circular positioning hole 5 in a penetrating manner. A plug means 6 is provided on the base plate 1, corresponding to the positioning hole 5.

Hereinafter, an explanation will be made for a structure of the plug means 6 by referring to FIG. 1 through FIG. 3.

As illustrated in FIG. 2, an upper surface of the base plate 1 is formed an installation hole 8. A housing 9 is fitted into the installation hole 8 in an accurately positioned state. A flange 9a of the housing 9 is fixed to the base plate 1 by a plurality of tightening bolts 10 (refer to FIG. 1). A plug member 12 is projected upward from the housing 9 (toward a leading end). The plug member 12 is allowed to be inserted into the positioning hole 5. An axis of the plug member 12 coincides with an axis of the installation hole 8.

On an outer periphery of the plug member 12 is formed a pair of slide outer surfaces 64, 64 facing each other in a radial direction. The slide outer surfaces 64, 64 are formed into vertical flat surfaces which are parallel to the axis of the plug member 12.

Outside the plug member 12 is provided a pair of slide portions 61, 61. The slide portions 61, 61 are arranged so as to oppose each other across the plug member 12 in a radial direction.

On inner surfaces of the slide portions 61, 61 are formed slide surfaces 63, 63 respectively. The slide surfaces 63, 63 are also formed into vertical flat surfaces which are parallel to the axis of the plug member 12, as with the slide outer surface 64. The slide portions 61, 61 are arranged so that the slide surfaces 63, 63 come into contact with the slide outer surfaces 64, 64, and allowed to move toward a first radial direction (or a first diametrical direction) D1 given in FIG. 3, along the slide surfaces 63, 63.

On outer surfaces of the slide portions 61, 61 are respectively provided tapered inclined outer surfaces 13, 13 which get closer to the axis upward (toward the leading end).

As illustrated in FIG. 3, outside the slide portions 61, 61 around the outer periphery of the plug member 12 is arranged an annular sleeve member 15 (pressing member). The sleeve member 15 is formed into a collet shape. Specifically, on a peripheral wall 15a of the sleeve member 15 is formed one slit 51 which extends axially to open in both upper and lower ends. Thereby, a substantially whole part of the peripheral wall 15a which extends circumferentially is allowed to elastically deform in a radial direction. When the sleeve member 15 is released for a diametrically expanding force thereof, the sleeve member 15 is restorable in a diametrically contracting direction due to its own elastic restoring force.

Over an entire inner periphery of the sleeve member 15 is formed an inclined inner surface 17. The inclined inner surface 17 is constructed in a tapered shape so as to get closer to the axis upward (toward the leading end). The inclined inner surface 17 is directly in contact with the inclined outer surfaces 13, 13 of the slide portions 61, 61. Further, between the sleeve member 15 and the plug member 12 are formed gaps A, A in the first radial direction D1, as illustrated in FIG. 3.

On the other hand, over an entire outer periphery of the sleeve member 15 is formed a straight outer surface 16, which is allowed to come into close contact with the positioning hole 5.

The slit 51 is not limited to a single slit but may be available in a plural number. For example, the slits 51 may be opened on both the upper and lower ends of the sleeve member 15 alternately and circumferentially.

A rotation stopper pin 52 is fixed to one of the two slide portions 61, and an outer end of the rotation stopper pin 52 projecting in a radial direction is inserted into the slit 51. Consequently, rotation of the sleeve member 15 is blocked. Further, in this case, an elastic seal member (not illustrated) such as rubber is accommodated in the slit 51 by adhesion, packing or the like. However, the elastic seal member may be omitted, depending on an application of the positioning apparatus.

Into a cylindrical hole of the plug member 12 is inserted a drive member 21 vertically movably. As illustrated in FIG. 2, the drive member 21 is provided with a piston 22 inserted hermetically into a lower part of the housing 9, a piston rod 23 projected upward from the piston 22, a bolt 24 screwed onto an upper part of the piston rod 23, a cap member 25 fixed by the bolt 24, and a ring 26 held between the cap member 25 and an upper end surface of the piston rod 23. Between the cap member 25 and the ring 26 is fitted an upper flange 27 of the sleeve member 15 horizontally movably.

A pin 55 is inserted into the piston 22 and the pin 55 is engaged with an engaging hole formed in the housing 9. Consequently, rotation of the drive member 21 is blocked.

Inside the housing 9 are provided both a lock means 31 and a release means 32 which construct the drive means D. The lock means 31 is constructed with a hydraulic chamber 34 provided for locking (hereinafter, referred to as a lock chamber) arranged above the piston 22 and with the piston 22. Further, the release means 32 is constructed with a hydraulic chamber 35 provided for releasing (hereinafter, referred to as release chamber) provided below the piston 22 and with the piston 22.

The lock chamber 34 is communicatively connected to a lock port 72 formed at a lower surface of the flange 9a via an oil passage 71 formed inside the housing 9. Further, the release chamber 35 is communicatively connected to a bottom portion of the installation hole 8.

On the lower surface of the flange 9a is provided a blow port 73. The blow port 73 is communicatively connected with the inside of the cylindrical hole of the plug member 12 via an air passage 74 formed inside the housing 9. Further, an outer surface of the piston rod 23 is notched partially circumferentially to form a vertical passage 75, and the vertical passage 75 is communicatively connected to the air passage 74.

When compressed air is supplied to the blow port 73, the compressed air is led to a space between the upper end surface of the plug member 12 and the ring 26 via the air passage 74 and the vertical passage 75, and discharged via the slit 51, the gap A and the like. Thereby, various portions, such as the inclined outer surfaces 13, 13 and the inclined inner surface 17, can be cleaned.

An annular shallow recess is formed on an upper part of the outer peripheral surface of the sleeve member 15, and an annular cover member 53 is fitted into the recess. The cover member 53 is formed in a circumferentially seamless manner, covering the outside of an upper part of the slit 51. An upper end surface of the cover member 53 is in contact with a lower end surface of the cap member 25.

Further, outside a lower end part of the plug member 12 is arranged a collar 54 formed in a circumferentially seamless manner. The collar 54 is fitted into a lower portion of an inner periphery of the sleeve member 15 between the flange 9a and the slide portion 61.

The cover member 53 and the collar 54 act to prevent intrusion of foreign matter such as metal swarf inside the sleeve member 15.

Between the upper flange 27 of the sleeve member 15 and the ring 26 is formed an annular gap. The annular gap allows the sleeve member 15 to deform and move in the diametrically expanding direction and diametrically contracting direction. Further, between an outer peripheral surface of the plug member 12 and the collar 54 is formed an annular gap. The annular gap also allows the sleeve member 15 to deform and move, as described above.

Figure 4:
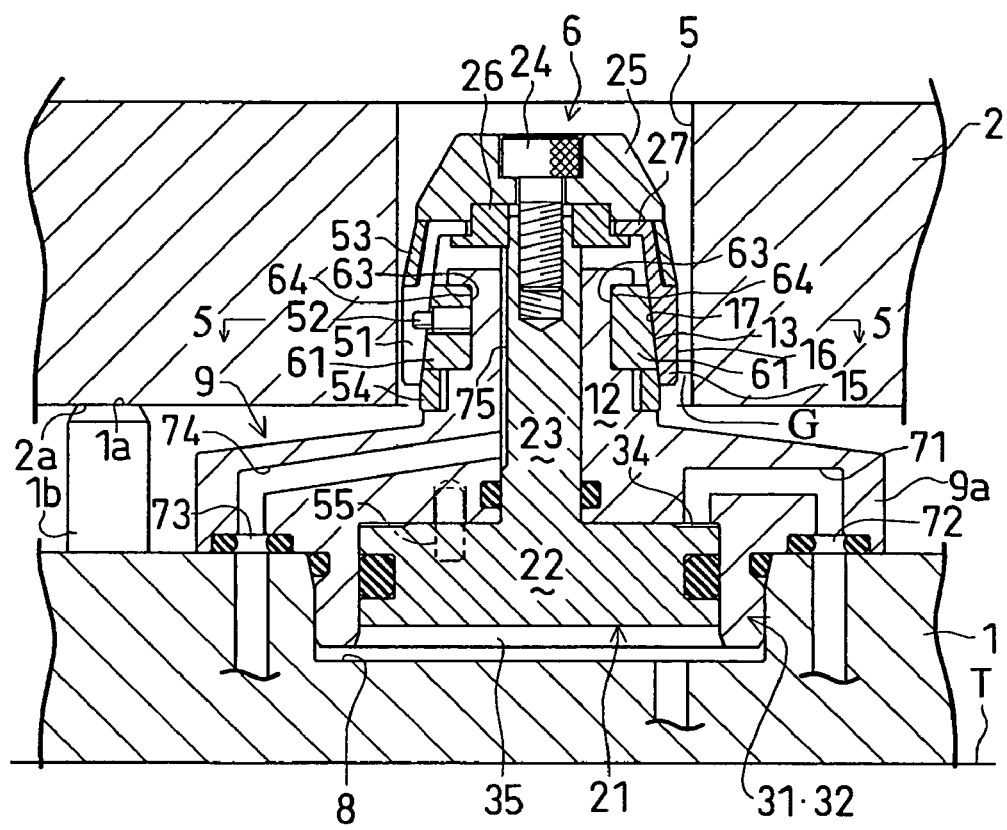
FIG. 4 is an elevational cross sectional view illustrating a state in which the plug means is inserted into a positioning hole.
Figure 5:
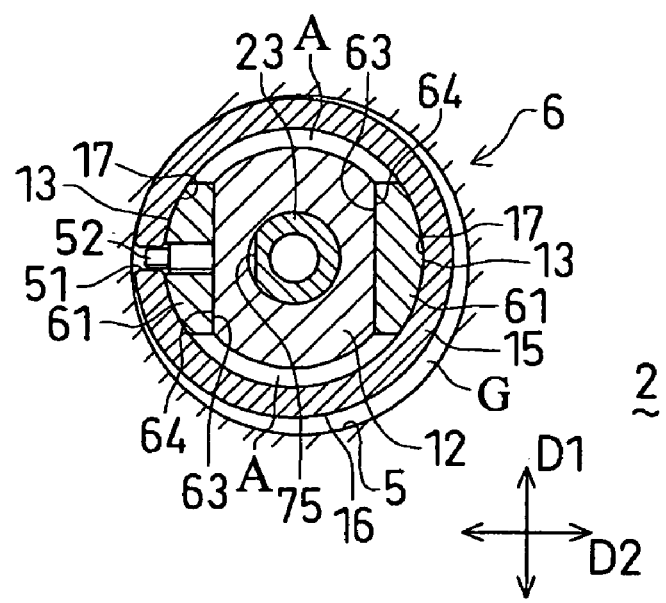
FIG. 5 is across sectional view indicated by the arrow 5-5 in FIG. 4.
Figure 6:
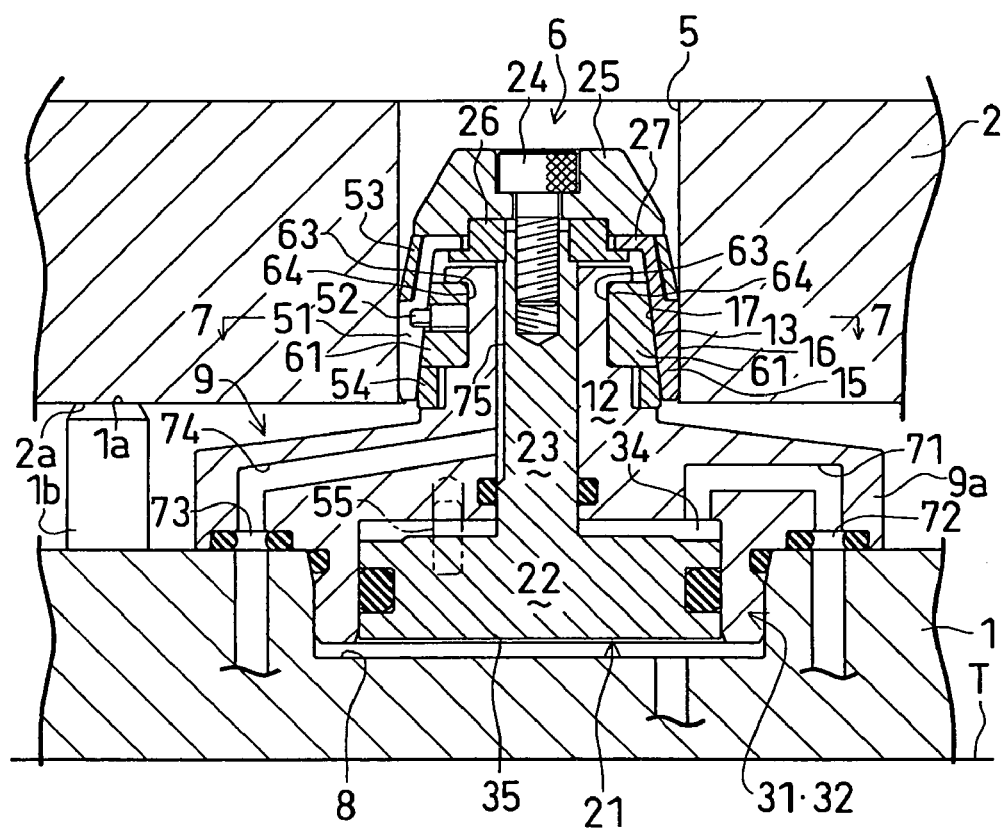
FIG. 6 is an elevational cross sectional view illustrating a state in which a sleeve member of the plug means expands diametrically to come into close contact with an inner periphery surface of the positioning hole.
Figure 7:
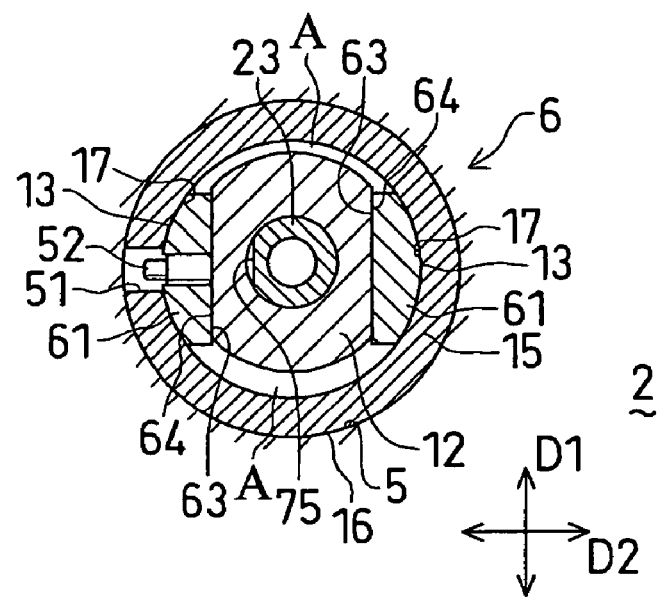
FIG. 7 is across sectional view indicated by the arrow 7-7 in FIG. 6.

An explanation will be made for operation of the positioning apparatus by referring to FIG. 2 and FIG. 3, and FIG. 4 through FIG. 7. FIG. 4 is an elevational cross sectional view illustrating a state in which the plug means 6 is inserted into the positioning hole 5. FIG. 5 is across sectional view indicated by the arrow 5-5 in FIG. 4. FIG. 6 is an elevational cross sectional view illustrating a state in which the sleeve member 15 of the positioning apparatus diametrically expands to come into close contact with an inner peripheral surface of the positioning hole 5. FIG. 7 is across sectional view indicated by the arrow 7-7 in FIG. 6.

In a released state illustrated in FIG. 2 and FIG. 3, pressurized oil has been discharged from the lock chamber 34 and pressurized oil has been supplied to the release chamber 35. Thereby, the piston 22 has raised the piston rod 23, the piston rod 23 has raised the sleeve member 15 via the bolt 24 and the ring 26, and the sleeve member 15 has been switched to a contracted condition. In this instance, between the upper end surface of the plug member 12 and the lower surface of the ring 26 is formed a contacting gap.

When the work pallet 2 is positioned with respect to the base plate 1, first, as illustrated in FIG. 4, in the above-described released state, the work pallet 2 is lowered and the straight outer surface 16 of the sleeve member 15 is inserted into the positioning hole 5. It is desirable that when the insertion of the work pallet 2 is conducted, compressed air is supplied to the blow port 73, thereby blowing foreign matter attached on various portions such as an inner peripheral surface of the positioning hole 5 and cleaning them. Since the sleeve member 15 is in a contracted condition, as described above, an annular fitting gap G is formed between the straight outer surface 16 inserted into the positioning hole 5 and the inner peripheral surface of the positioning hole 5.

It is noted that an explanation will be made hereinafter that, upon such insertion, an axis of the positioning hole 5 is misaligned to the axis of the plug member 12, and also misaligned to the first radial direction D1 which is parallel with the slide surface 63 or a second radial direction (or a second diametrical direction) D2 which is orthogonal thereto, as illustrated in FIG. 5. The fitting gap G is formed into an eccentric gap as illustrated in FIG. 5, due to the above axial misalignment.

It follows that the pressurized oil is discharged from the release chamber 35 and pressurized oil is supplied to the lock chamber 34 via the lock port 72. Then, the piston 22 strongly lowers the sleeve member 15 via the bolt 24 and the ring 26 by hydraulic force of the lock chamber 34 (lock movement). As a result, the inclined inner surface 17 of the sleeve member 15 is wedge-engaged with the inclined outer surfaces 13, 13 of the slide portions 61, 61. Thereby, as illustrated in FIG. 6 and FIG. 7, the sleeve member 15 expands elastically toward the second radial direction D2 to come into close contact with the inner peripheral surface of the positioning hole 5. In the closely contacted condition, the fitting gap G illustrated in FIG. 4 and FIG. 5 is eliminated.

More specifically, the sleeve member 15 allows the diametrically expanding force to act on the inner peripheral surface of the positioning hole 5 only at portions opposed to the slide portions 61, 61 (the inclined outer surfaces 13, 13), instead of the entire circumference. Therefore, regarding positional misalignment of the positioning hole 5 with respect to the plug member 12 (the positional misalignment illustrated in FIG. 5), a positional misalignment in the second radial direction D2 is allowed to be corrected by the closely contacted condition. On the other hand, since the slide portions 61, 61 are movable along the slide surfaces 63, 63 to the first radial direction D1, as illustrated in FIG. 7, the sleeve member 15 is allowed to move to some extent toward the first radial direction D1, together with the slide portions 61, 61, by the component force of the first radial direction D1 of a reaction force applied from the inner peripheral surface of the positioning hole 5, when the positioning hole 5 is pushed. Therefore, regarding positional misalignment of the positioning hole 5 to the plug member 12, a positional misalignment in the first radial direction D1 is allowed. In other words, the plug means 6 makes an accurate positioning in the direction at which slide portions 61, 61 oppose each other (the second radial direction D2) and allows positional misalignment in a direction orthogonal thereto (the first radial direction D1).

At the same time with the above positioning, the drive member 21 lowers the work pallet 2 via the sleeve member 15. Thereafter, a clamp means (not illustrated) acts to strongly press the work pallet 2 against the base plate 1. It is noted that, during the locking movement, the lower surface of the ring 26 comes into contact with the upper end surface of the plug member 12, thereby preventing the sleeve member 15 from being lowered to a range greater than a predetermined range.

When the state of the positioning apparatus is switched from the locked condition to the released condition, first, the clamp means (not illustrated) is released, then, the pressurized oil is discharged from the lock chamber 34 and pressurized oil is supplied to the release chamber 35. Thereby, the sleeve member 15 is raised by the bolt 24 and the ring 26 (release movement), and the sleeve member 15 returns into a contracted condition due to its own elastic restoring force, thereby releasing the locked condition. Thereafter, the work pallet 2 is raised.

As explained above, in the present embodiment, the sleeve member 15 is allowed to be positioned, while the sleeve member 15 is inserted into the positioning hole 5 and the fitting gap G (refer to FIG. 4 and FIG. 5) is allowed to be eliminated. Therefore, it is possible to smoothly and easily fit the sleeve member 15 into the positioning hole 5 and at the same time conduct positioning with high accuracy. Further, during the locking movement, the drive member 21 can press the work pallet 2 against the base plate 1 via the sleeve member 15. Therefore, for example, where a lowering force of the sleeve member 15 during the locking drive is given a sufficiently large value, an exclusive clamp means may be omitted.

Further, in a direction at which the slide portions 61, 61 oppose each other (the second radial direction D2), positioning with high accuracy can be conducted. And, in a direction parallel to the slide surface 63 (the first radial direction D1), positional misalignment of the positioning hole 5 to the plug member 12 is allowed.

In addition, in the present embodiment, positional misalignment of the positioning hole 5 to the plug member 12 in the first radial direction D1 can be absorbed by the slide portions 61, 61 which slide along the slide surface 63. A specific explanation will be made for the effect by comparison with the construction example given in FIG. 8.

Figure 8:
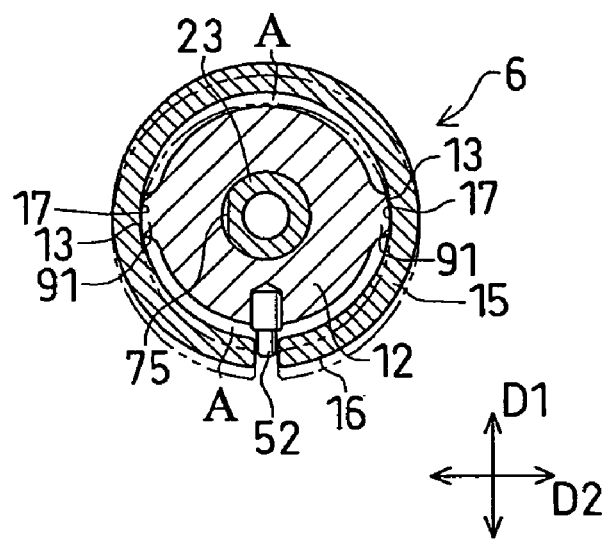
FIG. 8 is a comparative view explaining effects of the positioning apparatus, corresponding to FIG. 3.

The construction as given in FIG. 8 may be available as a construction wherein positioning is conducted with high accuracy in the second radial direction D2 and also positional misalignment is allowed in the first radial direction D1. FIG. 8 is a view illustrating a construction that the inventor proposed previously, corresponding to FIG. 3. In this case, instead of the slide portions 61, 61, projections 91, 91 projecting in the second radial direction D2 are formed on the outer peripheral surface of the plug member 12 so as to oppose each other in a radial direction. On these projections 91, 91 are formed the inclined outer surfaces 13, 13. The inclined outer surface 13, 13 are able to make a tapering engagement with the inclined inner surface 17 of the sleeve member 15. The plug member 12 is provided with escape grooves at positions between said projections 91, 91. As a result, between the sleeve member 15 and the plug member 12 are formed gaps A, A in the first radial direction D1.

In the construction given in FIG. 8 as well, by the locking movement of the sleeve 15, positioning with high accuracy can be conducted in the second radial direction D2, and by movement of the sleeve member 15 as illustrated by the chain line, positional misalignment can be absorbed in the first radial direction orthogonal to the second radial direction D2.

However, in the construction given in FIG. 8, when the sleeve member 15 moves in the first radial direction D1, as illustrated by the chain lines, with respect to the projections 91, 91, the inclined outer surface 13 on a leading end surface of the projection 91 comes into partial contact with the inclined inner surface 17 on the inner periphery of the sleeve member 15. A great friction occurs at the partially contacted portion, thereby making it impossible that the sleeve member 15 moves smoothly in the first radial direction D1 with respect to the projections 91, 91. Further, when the sleeve member 15 moves in the first radial direction D1, a lopsided force may be often locally applied to corners of the inclined outer surface 13 or to the inclined inner surface 17. In particular, when an external force in the second radial direction D2 is applied to the work pallet 2 in a positioned state, an excessive force may be applied to the partially contacted portion, and damages such as impression may develop on the inclined outer surface 13 or on the inclined inner surface 17. In order to prevent the harmful results, it is necessary to use high-quality materials such as special alloy steels or to provide proper hardening process for the materials, resulting in an increased production cost.

Further, in order to reduce harmful results resulting from the partial contact above, there is a case that the projections 91, 91 are made narrow to decrease a contact area between the inclined outer surface 13 of the leading end surface thereof and the inclined inner surface 17 of the sleeve member 15. However, in this case, since a force is transmitted in a small area, a diametrically expanding force against the sleeve member 15 in the second radial direction D2 cannot be secured to a sufficient extent. In addition, a lowering force against the work pallet 2 cannot be secured to a sufficient extent.

However, in the construction of the present embodiment (refer to FIG. 7), where the sleeve member 15 is moved in the first radial direction D1 in order to absorb positional misalignment in the first radial direction D1, the slide portions 61, 61 are also moved accordingly, by which the inclined outer surfaces 13, 13 do not come into partial contact with the inclined inner surface 17. Therefore, the inclined outer surfaces 13, 13 or the inclined inner surface 17 are not damaged.

Further, in the construction of the present embodiment, even where a contacting area between the inclined outer surfaces 13, 13 and the inclined inner surface 17 is secured to a large extent, the sleeve member 15 is allowed to move smoothly along the slide surface 63, together with the slide portions 61, 61. Therefore, during the lock operation, the sleeve member 15 follows positional misalignment of the first radial direction D1 and smoothly slides, thereby making it possible to smoothly absorb the positional misalignment of the first radial direction D1. This fact means that a contact area between the inclined outer surfaces 13, 13 and the inclined inner surface 17 can be secured to a large extent, therefore a diametrically expanding force which is applied by the sleeve member 15 to the inner peripheral surface of the positioning hole 5 can be secured to a large extent. It also means that the lowering force which pulls the work pallet 2 downward in such a condition that the sleeve member 15 is in close contact with the inner peripheral surface of the positioning hole 5 can be secured to a large extent.

In addition, in the present embodiment, the sleeve member 15 is formed into an annular shape, thus preventing intrusion of foreign matter such as swarf inside the sleeve member 15.

Furthermore, between the sleeve member 15 and the plug member 12 are formed gaps A, A in the first radial direction D1. Therefore, during the locking movement, the sleeve member 15 follows positional misalignment of the first radial direction D1 and smoothly slides, thereby making it possible to smoothly absorb the positional misalignment of the first radial direction D1.

In the present embodiment, the slit 51 is formed in the sleeve member 15. And, the sleeve member 15 is allowed to deform in the diametrically expanding and diametrically contracting direction with the slit 51. Therefore, such a mechanically simple construction that the sleeve member 15 is allowed to deform in the diametrically expanding and diametrically contracting direction is realized. Further, as compared with a case where the sleeve member 15 is formed in a seamless manner, the sleeve member 15 is allowed to deform to a large extent. Accordingly, since the fitting gap G (illustrated in FIG. 4 and FIG. 5) can be secured to a large extent in the contracted condition, workability when inserting the straight outer surface 16 into the positioning hole 5 is excellent.

In the present embodiment, as illustrated in FIG. 3, the slit 51 of the sleeve member 15 is arranged so as to oppose an outer surface (the inclined outer surface 13) of the slide portion 61. Therefore, the embodiment is constructed so as to prevent intrusion of foreign matter such as swarf into a gap (the gap A) between the sleeve member 15 and the plug member 12 via the slit 51, making it possible to avoid troubles such as defects resulting from the foreign matter without fail.

An explanation has been made for the first embodiment, which may be modified as illustrated in the following (1) to (6).

(1) The inclined outer surface 13 may be provided on an outer surface of another member arranged outside the slide portions 61, 61, instead of being provided on the outer surface of the slide portions 61, 61. Further, the slide outer surface 64 may be provided on an outer surface of another member arranged outside the plug member 12, instead of being provided on the outer surface of the plug member 12.

A pair of the slide portions 61, 61 and the collar 54 may be formed integrally, instead of being formed separately.

Further, a pair of the slide portions 61, 61 may be connected via a thin member (not illustrated) extending along each of the gaps A, or formed integrally with the thin member.

(2) The sleeve member 15 may be formed in an annularly seamless manner, instead of providing the slit 51.

(3) The drive member 21 is driven for locking or driven for releasing by hydraulic pressure. However, it may be driven by supplying, for example, compressed air to the lock chamber 34 or the release chamber 35. Further, the drive member 21 is not necessarily driven by a pressurized fluid but may be driven for locking using, for example, a spring, and may be driven for releasing using a spring. A compression coil spring, a single or a laminated coned disc spring may be employed as the spring.

(4) The plug means 6 may be inserted into the positioning hole 5 by raising the base plate 1, instead of lowering the work pallet 2. Further, the present embodiment may be constructed so that the work pallet 2 descends and the base plate 1 ascends at the same time.

(5) The positioning hole 5 is formed on the work pallet 2 in a penetrating manner. However, the positioning hole 5 may be formed in such a shape as to be opened only on a lower surface of the work pallet 2.

(6) The present embodiment may be constructed in such a way that the plug member 12 and the positioning hole 5 are arranged so that their axes are kept lateral and the plug means 6 is inserted into the positioning hole 5 horizontally. As a matter of course, the plug means 6 may be inserted into the positioning hole 5 in an oblique direction.

Next, with reference to FIG. 9 through FIG. 17, an explanation will be made for a plurality of embodiments and exemplified variations of the positioning apparatus in the present invention. In these other embodiments, the members which are the same or similar to those used in the first embodiment are in principle given the same reference numerals.

Second Embodiment

Figure 9:
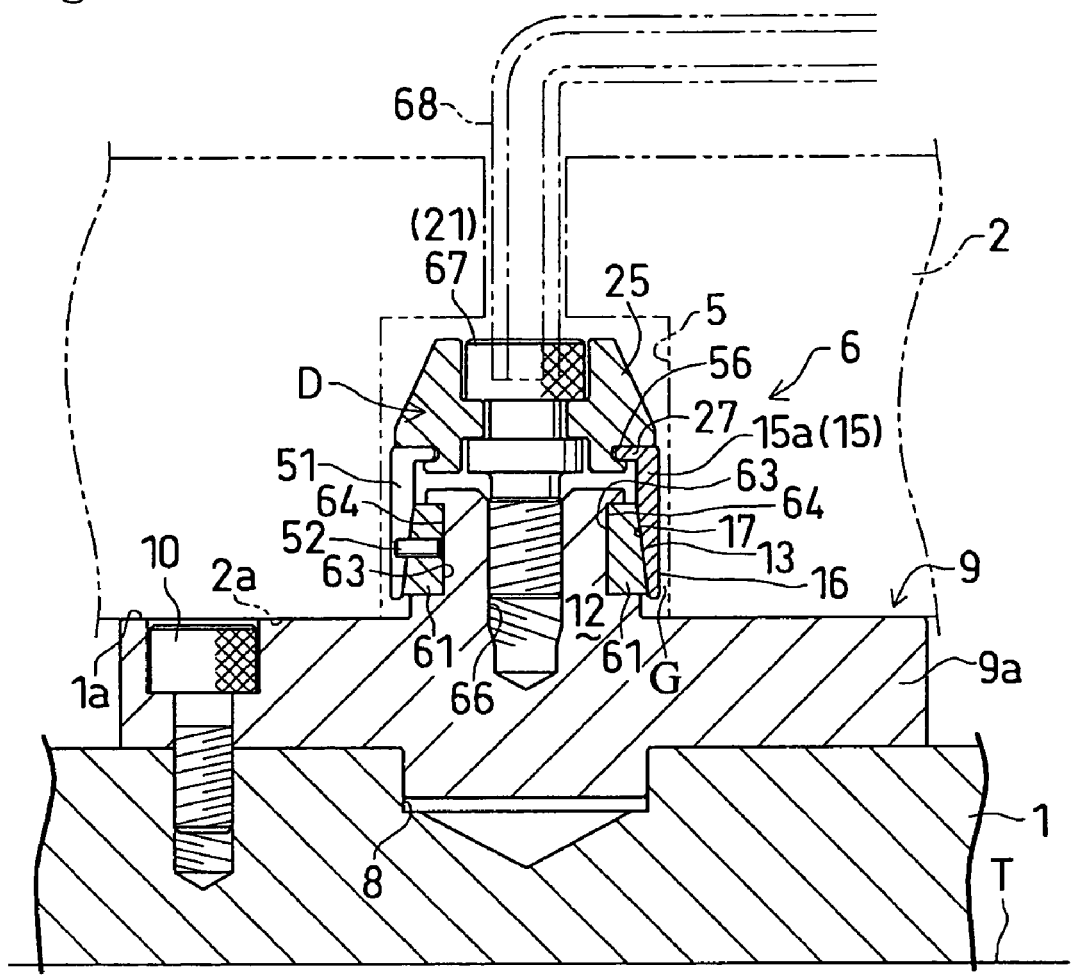
FIG. 9 is an elevational cross sectional view similar to FIG. 4, illustrating a positioning apparatus of a second embodiment of the present invention.

FIG. 9 is a view illustrating a second embodiment of the positioning apparatus, corresponding to FIG. 4.

In the second embodiment as illustrated in FIG. 9, no boss is formed on the base plate 1, but an upper surface of the flange 9a of the housing 9 is given as the support surface 1a and the supported surface 2a of the work pallet 2 is received on the support surface 1a.

Into the screw hole 66 opened on the upper end surface of the plug member 12 is fitted a lower part of a flanged bolt 67. On a head portion of the flanged bolt 67 is opened a hexagonal hole (not illustrated). As illustrated by the chain line, a hexagon wrench 68 is allowed to be engaged with the hole. Between the head of the flanged bolt 67 and a flange portion is supported the cap member 25 relatively rotatably and vertically unmovably. Into a engaging recess 56 formed at a lower part of the cap member 25 is fitted the upper flange 27 of the sleeve member 15.

In the present embodiment, the flanged bolt 67 corresponds to the drive member 21 mentioned above. Further, the drive means D is constructed with both the screw hole 66 and the hexagon wrench 68.

When the hexagon wrench 68 is inserted into the hole formed in the head of the flanged bolt 67 to turn the head, the flanged bolt 67 is screwed into a vertical direction. Thereby, the sleeve member 15 is moved downward for locking or moved upward for releasing. As a result, the sleeve member 15 expands or contracts in a radial direction due to a tapering engagement with the inclined outer surfaces 13, 13, which are the outer surfaces of the slide portions 61, 61. Other constructions and operations are similar to those described in the first embodiment.

Third Embodiment

FIG. 10 through FIG. 13 illustrate a third embodiment of the present invention.

Figure 10:
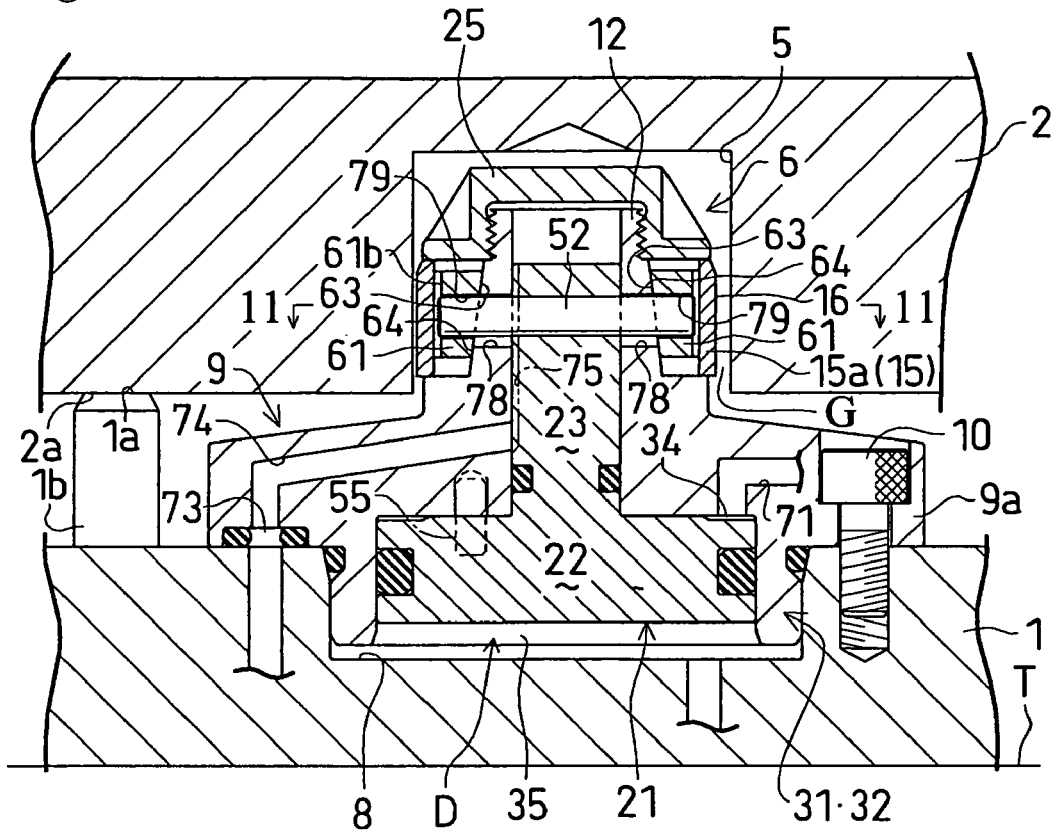
FIG. 10 is an elevational cross sectional view similar to FIG. 4, illustrating a positioning apparatus of a third embodiment in the present invention.
Figure 11:
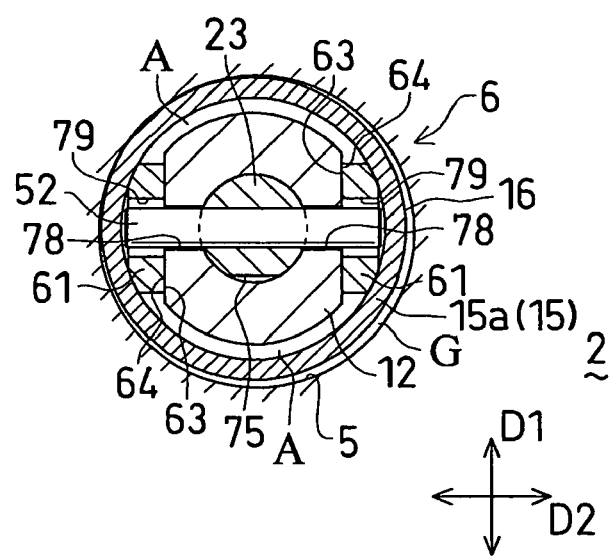
FIG. 11 is across sectional view indicated by the arrow 11-11 in FIG. 10.
Figure 12:
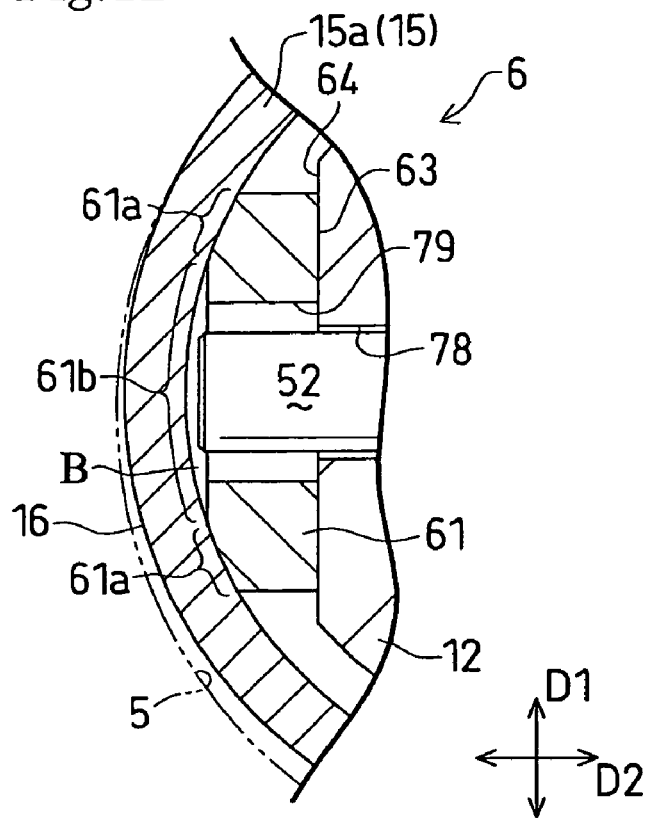
FIG. 12 is an enlarged view illustrating major parts of FIG. 11.
Figure 13:
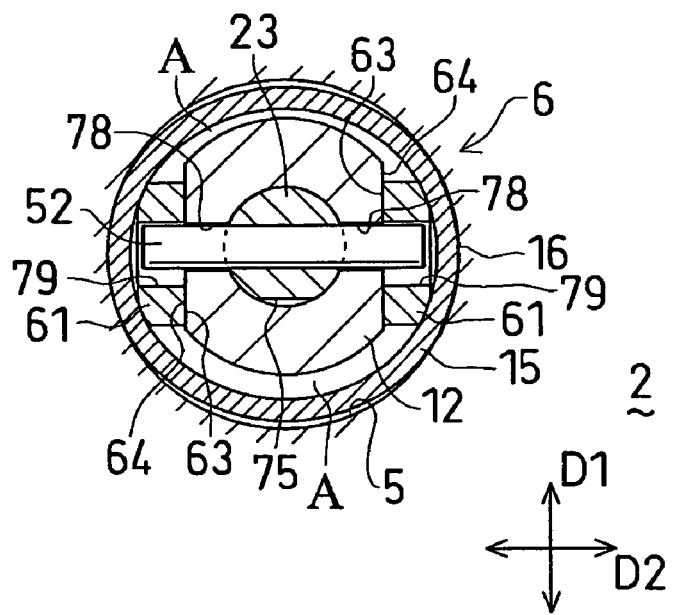
FIG. 13 is across sectional view illustrating a state in which the sleeve member given in FIG. 11 expands diametrically to come into close contact with an inner peripheral surface of the positioning hole.

FIG. 10 is a view corresponding to FIG. 4. FIG. 11 is a cross sectional view indicated by the arrow 11-11 in FIG. 10, corresponding to FIG. 5. FIG. 12 is an enlarged view illustrating major parts of FIG. 11. FIG. 13 is a cross sectional plan view illustrating the positioning apparatus in a locked state, corresponding to FIG. 7.

In the third embodiment, as illustrated in FIG. 10, the slide surfaces 63, 63 of the slide portions 61, 61 are formed in an inclined manner so as to get closer to the axis of the plug member 12 upward (toward the leading end). Further, corresponding thereto, on the plug member 12 is formed an inclined outer surface 64 which is allowed to make a tapering engagement with the slide surface 63. In addition, the outer surfaces of the slide portions 61, 61 are formed into a straight surface.

A cap nut 25 is screwed onto a male screw at the upper end portion of the plug member 12. In the plug member 12 is formed a pair of through holes 78, 78 facing each other in a radial direction. These through holes 78, 78 are formed into a vertically long and narrow shape.

In the slide portions 61, 61 are formed connection holes 79, 79 in a radial direction respectively. As illustrated in FIG. 11, these connection holes 79, 79 are formed into a long and narrow shape in the first radial direction D1.

As illustrated in FIG. 10, to the upper end portion (leading end portion) of the piston rod 23 is fixed a central portion of a connection pin 52. The connection pin 52 is extended out through the through holes 78, 78, and both ends thereof are inserted into the connection holes 79, 79 of the slide portions 61, 61.

As described above, since the through holes 78, 78 are formed into a vertically long and narrow shape, the connection pin 52 is allowed to move vertically. Further, since the connection holes 79, 79 are formed into a long and narrow shape in the first radial direction D1, the slide portions 61, 61 are allowed to move in the first radial direction D1 with respect to the connection pin 52.

As illustrated in FIG. 11, around the outer periphery of the plug member 12 is arranged an annular sleeve member 15. The sleeve member 15 is formed into a thin cylindrical shape, the peripheral wall 15a of which is not provided with any slit but formed in a circumferentially seamless manner. Further, an inner peripheral surface and an outer peripheral surface of the sleeve member 15 are formed into a straight surface.

FIG. 12 is an enlarged view illustrating one of the two slide portions 61, 61 in FIG. 11. As illustrated in this view, on the outer surface of each of the slide portions 61 are formed two contact portions 61a, 61a and an escape portion 61b arranged between these two contact portions circumferentially side by side. The contact portions 61a, 61a are formed into an arc surface so as to come into contact with the inner peripheral surface of the sleeve member 15. Further, the escape portion 61b is formed into a flat surface, and between the escape portion 61b and the inner peripheral surface of the sleeve member 15 is formed a gap B.

In the released state illustrated in FIG. 10 and FIG. 11, when the pressurized oil in the release chamber 35 is discharged and pressurized oil is supplied to the lock chamber 34, the drive member 21 is driven downward. Along with descent of the drive member 21, the connection pin 52 is moved downward inside the through hole 78, thereby lowering the slide portions 61, 61 connected to the both ends thereof (locking movement).

Consequently, the slide portions 61, 61 are shifted in a diametrically expanding direction by a tapering engagement of the slide surface 63 with the inclined outer surface 64, thereby pushing the sleeve member 15 from inside. As a result, the sleeve member 15 undergoes an elastic deformation so as to expand in the second radial direction D2 at which the slide portions 61, 61 are arranged to oppose each other and contract in the first radial direction D1 which is vertical thereto, thereby presenting substantially an oval shape as illustrated in FIG. 13. At the same time, in the sleeve member 15, a portion which is also deformed in a diametrically expanding direction comes into close contact with the inner peripheral surface of the positioning hole 5 of the work pallet 2.

In the third embodiment as well, as with the first embodiment, the sleeve member 15 allows the diametrically expanding force to act on the inner peripheral surface of the positioning hole 5 only at portions opposing the slide portions 61, 61 (strictly, only the contact portion 61a illustrated in FIG. 12). Therefore, regarding positional misalignment of the positioning hole 5 to the plug member 12 (the positional misalignment illustrated in FIG. 11), the positional misalignment in the second radial direction D2 is corrected by the closely contacted condition. On the other hand, since the slide portions 61, 61 are movable along the slide surface 63 and the inclined outer surface 64 to the first radial direction D1, as illustrated in FIG. 13, the sleeve member 15 is allowed to move to some extent toward the first radial direction D1, together with the slide portions 61, 61. Therefore, regarding positional misalignment of the positioning hole 5 to the plug member 12, the positional misalignment in the first radial direction D1 is allowed.

In order to release the locked condition, as with the first embodiment, the pressurized oil is discharged from the lock chamber 34 and pressurized oil is supplied to the release chamber 35. Then, the piston 22 is raised, and the slide portions 61, 61 connected to the piston rod 23 via the connection pin 52 are also raised (release movement). As a result, the sleeve member 15 releases the diametrically expanded condition in the second radial direction D2, while pushing back the slide portions 61, 61 to the diametrically contracting direction by its own resilient force, thereby releasing the locked condition.

Furthermore, in the positioning apparatus, since the work pallet 2 cannot be lowered via the sleeve member 15, an exclusive clamp means (not illustrated) for pressing the supported surface 2a of the work pallet 2 against the support surface 1a of the base plate 1 in the axial direction of the plug member 12 is required as a principle. However, where the work pallet 2 is substantially heavy, the supported surface 2a is actually pressed against the support surface 1a due to its own weight of the work pallet 2, an exclusive clamp means can be omitted.

An explanation has been made above for the positioning apparatus of the third embodiment. The positioning apparatus is provided with the sleeve member 15 formed annularly in a seamless manner, thereby preventing intrusion of foreign matter such as swarf inside the sleeve member 15.

Further, as illustrated in FIG. 12, the escape portion 61b is formed between the contact portions 61a, 61a on the outer surface of each of the slide portions 61, 61, and a gap B is formed between the escape portion 61b and an inner surface of the sleeve member 15. Therefore, an appropriate positioning can be conducted, even in such a case where the positioning hole 5 has a larger inner diameter and the sleeve member 15 is required to undergo a great displacement and deformation so as to come into close contact with the inner peripheral surface of the positioning hole 5. Specifically, since the construction is that the sleeve member 15 is pushed at two contact portions 61a, 61a each for the slide portions 61, 61, or a total of four contact portions, the sleeve member 15 is not pushed at the escape portion 61b, the sleeve member 15 deforms appropriately along the inner peripheral surface of the positioning hole 5 having a larger diameter so as to come into close contact therewith, applying a diametrically expanding force (force in the second radial direction D2) at the four points of the contact portions 61a, thereby making it possible to correct positional misalignment in the second radial direction D2 occurring between the positioning hole 5 and the plug member 12 appropriately and reliably.

Further, in the positioning apparatus of the third embodiment as illustrated above, a slit may be formed on the peripheral wall 15a of the sleeve member 15, by which the sleeve member 15 is allowed to greatly deform in a diametrically expanding direction and a diametrically contracting direction.

Fourth Embodiment

Figure 14:
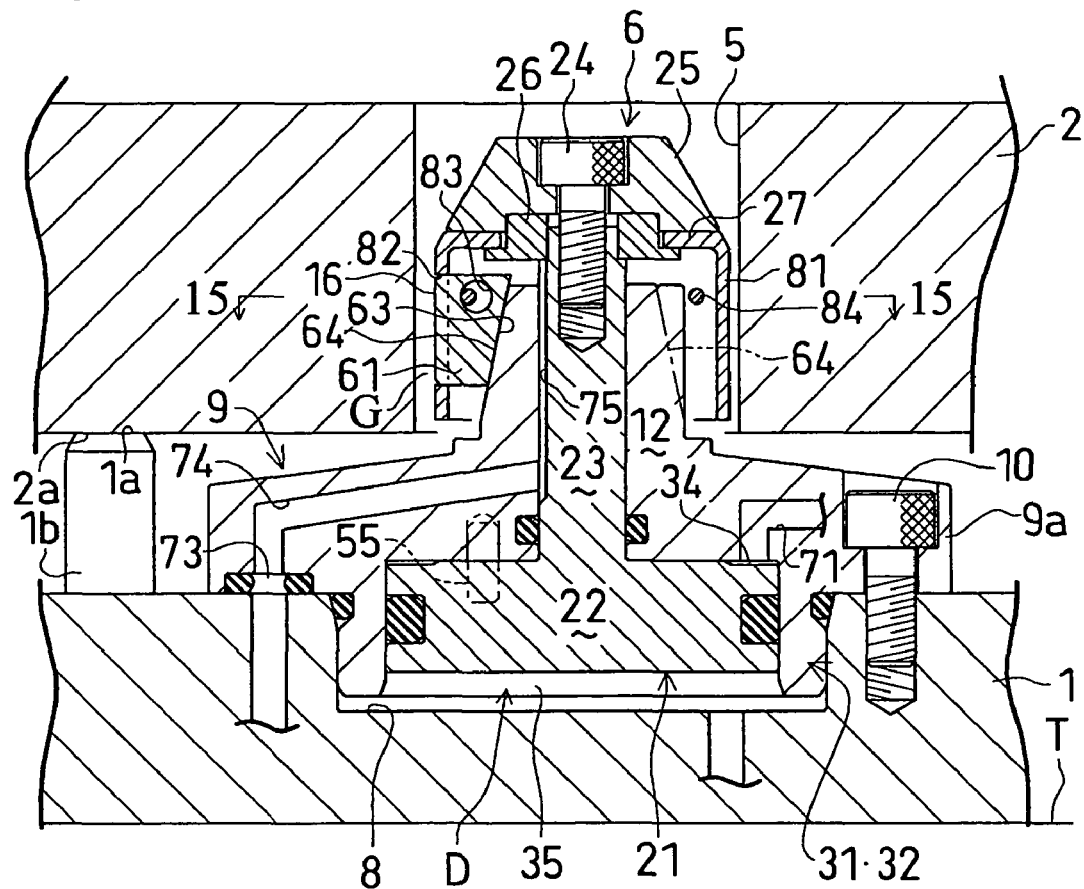
FIG. 14 is an elevational cross sectional view illustrating a positioning apparatus of a fourth embodiment of the present invention, corresponding to a view indicated by the arrow 14-14 in FIG. 15.
Figure 15:
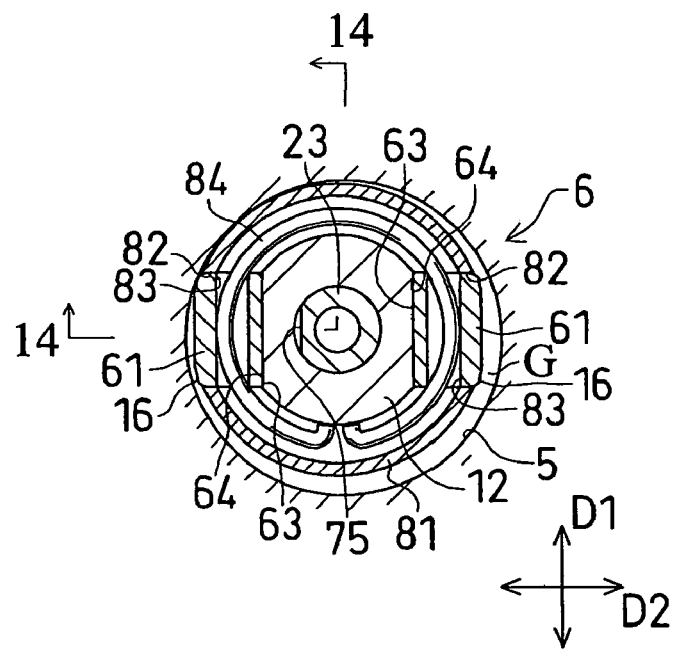
FIG. 15 is across sectional view indicated by the arrow 15-15 in FIG. 14.
Figure 16:
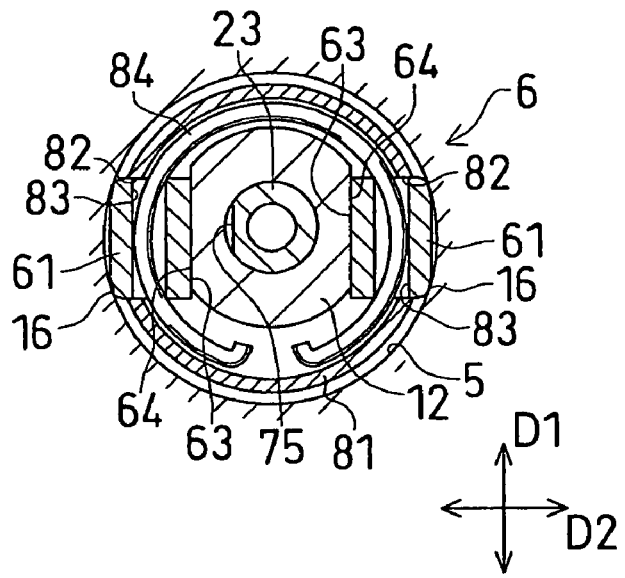
FIG. 16 is across sectional view illustrating a state in which a slide portion given in FIG. 15 expands diametrically to come into close contact with the inner peripheral surface of the positioning hole.

FIG. 14 through FIG. 17 illustrate a fourth embodiment of the present invention. FIG. 14 is a view that corresponds to FIG. 4. FIG. 15 is a cross sectional view indicated by the arrow 15-15 in FIG. 14, corresponding to FIG. 5. FIG. 16 is a view that corresponds to FIG. 7.

In the fourth embodiment, the slide surface 63 of the slide portion 61 is formed in an inclined manner so as to get closer to the axis of the plug member 12 upward (toward the leading end). Further, corresponding thereto, on the plug member 12 is formed an inclined outer surface 64 which can make a tapering engagement with the slide surface 63. At the slide portions 61, 61 is formed the straight outer surface 16 which is allowed to come into close contact with the inner peripheral surface of the positioning hole 5.

With a groove formed between the cap member 25 and the ring 26 is engaged an upper flange 27 of a connecting member 81 formed into a cylindrical shape. On a peripheral wall of the connecting member 81 is formed a support window 82 which opposes the inclined outer surface 64. Into the support window 82 is fitted the slide portion 61 so as to move in a radial direction.

In a pair of the slide portions 61 is formed a through hole 83 circumferentially. Into the through hole 83 is inserted a ring spring (urging member) 84 arranged around the outer periphery of the plug member 12.

In the released state illustrated in FIG. 14 and FIG. 15, when the pressurized oil is discharged from the release chamber 35 and pressurized oil is supplied to the lock chamber 34, the drive member 21 is driven downward. Along with descent of the drive member 21, the connecting member 81 is moved downward, thereby lowering the slide portions 61, 61 connected to the connecting member 81 (lock movement).

As a result, the slide portions 61, 61 undergo a diametrically expanding displacement (in the second radial direction D2), while allowing the ring spring 84 to undergo an elastic deformation by a tapering engagement of the slide surface 63 with the inclined outer surface 64. Thereby, the straight outer surfaces 16 of the slide portions 61, 61 come into close contact with the inner peripheral surface of the positioning hole 5.

The fourth embodiment is constructed in such a way that the slide portions 61, 61 undergo a diametrically expanding displacement in the second radial direction D2, allowing the straight outer surface 16 to come into close contact with the inner peripheral surface of the positioning hole 5 to apply the diametrically expanding force. Therefore, regarding positional misalignment of the positioning hole 5 to the plug member 12 (the positional misalignment illustrated in FIG. 15), the positional misalignment in the second radial direction D2 is allowed to be corrected by the closely contacted condition. On the other hand, since the slide portions 61, 61 is movable along the slide surface 63 and the inclined outer surface 64 to the first radial direction D1, as illustrated in FIG. 16, the slide portions 61, 61 are allowed to move to some extent toward the first radial direction D1, together with the connecting member 81, by the component force of the first radial direction D1 of a reaction force applied from the inner peripheral surface of the positioning hole 5, when the positioning hole 5 is pressed. Therefore, regarding positional misalignment of the positioning hole 5 to the plug member 12, the positional misalignment in the first radial direction D1 is allowed.

The present embodiment is constructed in such a way that the slide portions 61, 61 which undergo a diametrically expanding displacement come into direct contact with the inner peripheral surface of the positioning hole 5. Therefore, as compared with the first embodiment through the third embodiment in which the sleeve member 15 is deformed and allowed to come into close contact with the inner peripheral surface of the positioning hole 5, the slide portions 61, 61 are allowed to be displaced to a greater range.

Figure 17:
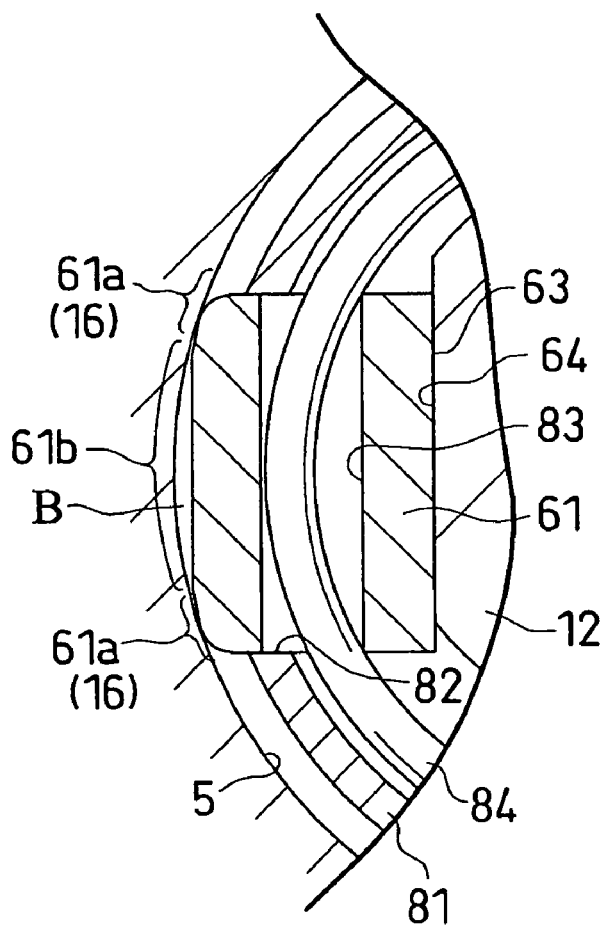
FIG. 17 is an enlarged view illustrating major parts of FIG. 16.

FIG. 17 is an enlarged view illustrating one of the slide portions 61, 61 given in FIG. 16. As illustrated in FIG. 17, on the outer surface of each of the slide portions 61, 61 are formed two contact portions 61a, 61a and an escape portion 61b arranged between these two contact portions circumferentially side by side. The contact portions 61a, 61a (corresponding to the straight outer surface 16) are formed into an arc surface and allowed to be in contact with the inner peripheral surface of the positioning hole 5. Further, the escape portion 61b is formed into a flat surface. And, when the contact portions 61a, 61a come into close contact with the inner peripheral surface of the positioning hole 5, a gap B is formed between the escape portion 61b and the inner peripheral surface of the positioning hole 5.

Since the contact portion 61a and the escape portion 61b are formed as described above, an appropriate positioning can be conducted, even in a case where the positioning hole 5 has a larger inner diameter and the slide portions 61, 61 are required to undergo a great displacement so as to come into close contact with the inner peripheral surface of the positioning hole 5. Specifically, the present embodiment is constructed in such a way that the inner peripheral surface of the positioning hole 5 is pushed at two contact portions 61a, 61a each for the slide portions 61, 61 or a total of four contact portions, but the inner peripheral surface of the positioning hole 5 is not pressed at the escape portion 61b. Therefore, a diametrically expanding force (force of the second radial direction D2) is allowed to be applied at the four points of the contact portions 61a, thereby making it possible to correct the positional misalignment of the second radial direction D2 occurring between the positioning hole 5 and the plug member 12 appropriately and reliably.

[Exemplified Variation]

The positioning apparatuses described in the first embodiment through the fourth embodiment may be modified as follows.

(1) The plug member 12 and the housing 9 may be formed separately, instead of being formed integrally. In this case, the plug member 12 may be firmly fixed to the housing 9 using bolts, screws and the like.

(2) Further, the housing 9 and the base plate 1 may be formed integrally, instead of being formed separately.

(3) The slide surfaces 63, 63 and the slide outer surfaces (inclined outer surfaces) 64, 64 may be formed in an inclined manner with respect to the first radial direction D1, instead of being formed in parallel with the first radial direction D1.

(4) The slide portions 61, 61 may be provided in two or more pairs of them, in addition to one pair of them.

[Clamping System]

Hereinafter, an explanation will be made for a first example applied to the clamping system of the positioning apparatus by referring to FIG. 18.

Figure 18:
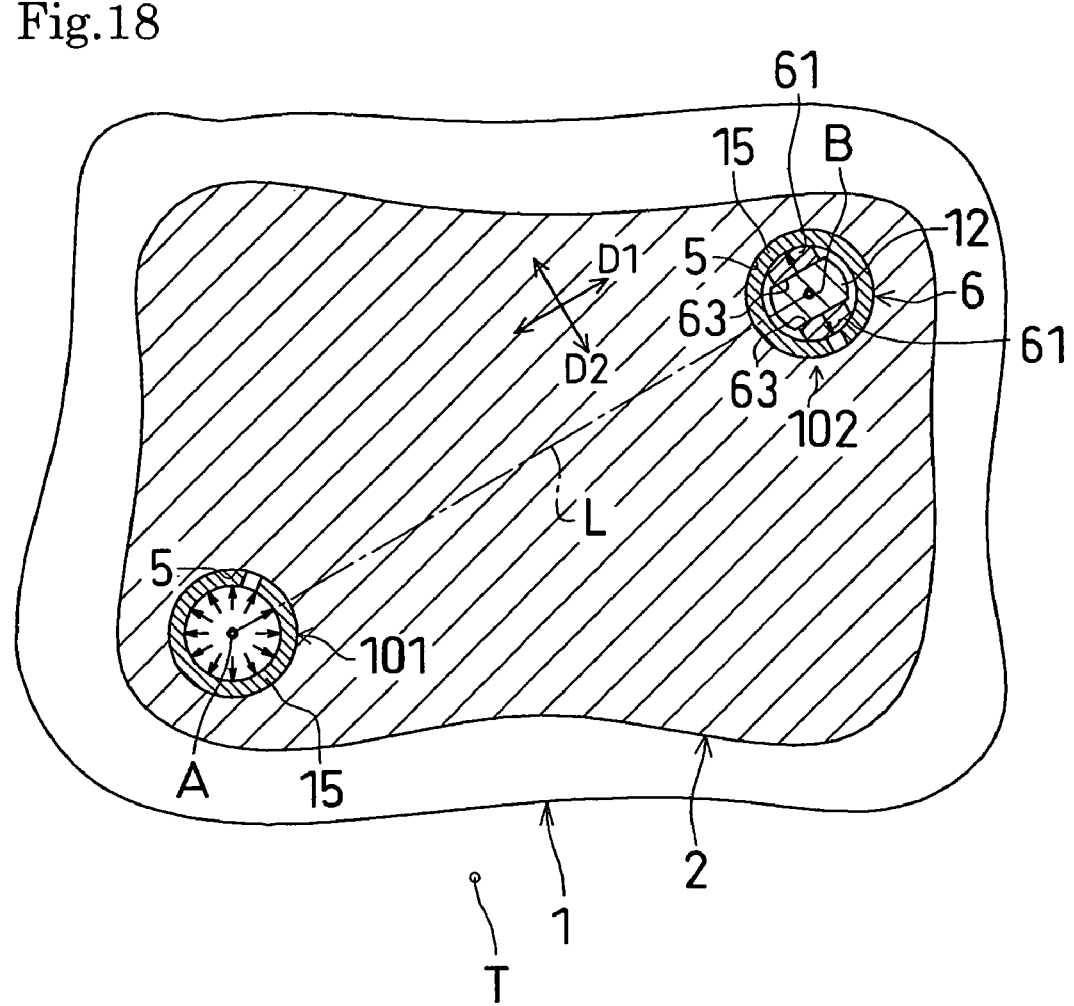
FIG. 18 is a schematic view of a plan sectional view illustrating a first example of the clamping system.

FIG. 18 is a schematic plan view of the clamping system.

As illustrated in FIG. 18, on an upper surface of a table T of a machining center is fixed the base plate 1. The work pallet 2 is allowed to be attached to or detached from the base plate 1 via the clamping system of the present invention. The clamping system is provided with a first positioning apparatus 101 and a second positioning apparatus 102.

The work pallet 2 is available in a plural number (only one piece is illustrated in the view) and may be exchanged and attached to the base plate 1, whenever necessary. When the work pallet 2 is attached to the base plate 1, it is positioned and fixed by the two positioning apparatuses 101, 102.

The first positioning apparatus 101 is provided with a sleeve member 15 which is inserted into an inner peripheral surface of the positioning hole 5 formed in the work pallet 2, and the sleeve member 15 is allowed to come into close contact with the inner peripheral surface of the positioning hole 5 by allowing a diametrically expanding force to act over substantially the whole periphery of the sleeve member 15, and the work pallet 2 is positioned horizontally via the sleeve member 15 with respect to the base plate 1. More specifically, the positioning is conducted in such a way that an axis of the positioning hole 5 coincides with an axis A of the first positioning apparatus 101. It follows that the closely contacted sleeve member 15 is driven downward to fix the work pallet 2 to the base plate 1.

Furthermore, the first positioning apparatus 101 may be available in various specific constructions, and, for example, in the positioning apparatus of the first embodiment, the slide portions 61, 61 are not provided but a tapered inclined outer surface 13 may be formed over the whole outer periphery of the plug member 12, and the inclined inner surface 17 of the sleeve member 15 is adapted to make a tapering engagement with the inclined outer surface 13.

Further, the positioning apparatus (refer to FIG. 1 and FIG. 2) of the first embodiment is employed as the second dpositioning apparatus 102. The slide portions 61, 61 are arranged in such a way that they oppose each other in the direction substantially orthogonal to a line L connecting an axis A of the positioning apparatus 101 with an axis B of the positioning apparatus 102. In other words, they are arranged so that the second radial direction D2 is substantially orthogonal to the line L. Therefore, a diametrically expanding force acts on the sleeve member 15 in the direction at which the slide portions 61, 61 oppose each other (the second radial direction D2), by which rotation of the work pallet 2 around the axis A is blocked. In this instance, the sleeve member 15 moves together with the slide portions 61, 61 along the slide surfaces 63, 63 (the first radial direction D1), thereby absorbing an axial misalignment to the axis A. It follows that the closely contacted sleeve member 15 is driven downward to fix the work pallet 2 to the base plate 1.

Since the positioning apparatus of the first embodiment is employed as the second positioning apparatus 102 in the present clamping system, positioning is allowed to be conducted with high accuracy. Further, when the work pallet 2 and the base plate 1 are attached and detached, a state in which the fitting gap G (illustrated in FIG. 4 and FIG. 5) is formed between the inner peripheral surface of the positioning hole 5 and the straight outer surface 16 in the second positioning apparatus 102 is allowed. Thereby, workability is improved upon attachment and detachment. Further, during the lock movement as described above, in the second positioning apparatus 102, the work pallet 2 is moved closer to the base plate 1 via the sleeve member 15, thereby making it possible to omit an exclusive clamp means, whenever necessary.

In addition, when the positioning apparatus of the first embodiment is employed at least as one of these positioning apparatuses 101, 102, a clamping system capable of positioning in various modes is provided, as exemplified in the present clamping system.

FIG. 19 is a schematic plan view illustrating a second example applied to the clamping system of the above-described positioning apparatus. The second example is constructed as a preferable example for fixing a long work pallet 2 to the base plate 1. As illustrated in FIG. 19, in the second example, three positioning apparatuses 111 through 113 of the first embodiment are provided side by side in a longitudinal direction of the work pallet 2.

In the middle positioning apparatus 112, a direction to which the slide portions 61, 61 are opposed is along the longitudinal direction of the work pallet 2. In the positioning apparatus 112, the work pallet 2 is positioned with respect to the longitudinal direction.

Further, in the positioning apparatuses 111, 113 at both ends, a direction to which the slide portions 61, 61 are opposed is substantially vertical to the longitudinal direction of the work pallet 2. These positioning apparatuses 111, 113 are employed for positioning with respect to the direction orthogonal to the longitudinal direction of the work pallet 2, also blocking rotation of the work pallet 2 around the axis of the middle positioning apparatus 112.

[Exemplified Variation of the Clamping System]

The above-described clamping system can be changed as follows.

(1) The first example given in FIG. 18 is not limited to a construction in which the positioning apparatus of the first embodiment is employed as the second positioning apparatus 102, but, for example, the positioning apparatus described in the second embodiment through the fourth embodiment may be employed. Also in the second example given in FIG. 19, the positioning apparatus described in the second embodiment through the fourth embodiment may be employed instead of the positioning apparatus of the first embodiment.

(2) In addition to the above-described positioning apparatuses 101, 102, an exclusive clamp means capable of pressing the supported surface 2a of the work pallet 2 against the support surface 1a of the base plate 1 may be provided in the first example in FIG. 18. This construction is also applicable to the second example in FIG. 19.

(3) The combination of the first block and the second block may be a combination of a table of a machine tool and a work pallet, a combination of a work pallet and a jig base, a combination of a jig base and a work piece, or a combination of a working jig such as a welding jig and a working article such as a work piece, instead of the exemplified combination of the base plate 1 and the work pallet 2. Further, the combination may be a set of a board of an injection molding machine or of a pressing machine and a mold. In addition, the present invention is applicable to positioning of a work piece, a tool and the like used in various processing machines such as laser processing machines and electric discharge processing machines.

What is claimed is:

1. A positioning apparatus, wherein
   a plug member inserted into a positioning hole formed in a second block is projected from a first block,
   a plurality of slide portions opposed to each other in a second radial direction across the plug member are arranged around the plug member movably in a first radial direction substantially orthogonal to the opposed second radial direction of the slide portions,
   an annular pressing member which is allowed to diametrically expand and diametrically contract is arranged around an outer periphery of the slide portions, and
   a drive arrangement drives the slide portions to diametrically expand the pressing member in the second radial direction to press the pressing member against a peripheral surface of the positioning hole, wherein the slide portions are moved in the first radial direction with respect to the plug member.

2. The positioning apparatus as set forth in claim 1, wherein
   inclined outer surfaces which get closer to an axis of the plug member toward a leading end are formed on an outer surfaces of the slide portions,
   an inclined inner surface which is allowed to make a tapering engagement with the inclined outer surfaces is formed on the pressing member,
   a drive member is inserted into the plug member axially movably, and the drive member is connected to the pressing member,
   the drive member moves the pressing member toward a base end for locking to expand the pressing member in the second radial direction by the tapering engagement of the inclined inner and outer surfaces to bring the pressing member into close contact with the inner peripheral surface of the positioning hole, and
   the drive member also moves the pressing member toward the leading end for releasing to cancel the expanded condition of the pressing member and cancel the closely contacted condition of the pressing member.

3. The positioning apparatus as set forth in claim 1, wherein
   inclined outer surfaces which get closer to an axis of the plug member toward a leading end and oppose each other in the second radial direction are formed on the plug member,
   the slide portions are allowed to make a tapering engagement with the inclined outer surfaces from the leading end side,
   a drive member is inserted into the plug member axially movably, and the drive member is connected to the slide portions,
   the drive member moves the slide portions toward a base end for locking to diametrically expand the pressing member in the second radial direction by the tapering engagement of the slide portions and the inclined outer surfaces to bring the pressing member into close contact with the inner peripheral surface of the positioning hole, and the drive member also moves the slide portions toward the leading end for releasing to cancel the expanded condition of the pressing member and cancel the closely contacted condition of the pressing member.

4. The positioning apparatus as set forth in claim 1, wherein the pressing member is formed into an annular shape.

5. The positioning apparatus as set forth in claim 4, wherein gaps are formed between the pressing member and the plug member in the first radial direction.

6. The positioning apparatus as set forth in claim 4, wherein a slit is formed in the pressing member to allow the pressing member to deform in a diametrically expanding direction and a diametrically contracting direction.

7. The positioning apparatus as set forth in claim 4, wherein the pressing member is formed in an annularly seamless manner.

8. The positioning apparatus as set forth in claim 7, wherein two contact portions allowed to come into contact with an inner surface of the pressing member and an escape portion arranged between the two contact portions are formed on an outer surface of each of the slide portions circumferentially side by side, and
a gap is formed between the escape portion and the pressing member.

9. A positioning apparatus, wherein
a plug member inserted into a positioning hole formed in a second block is projected from a first block,
a plurality of slide portions opposed to each other in a second radial direction across the plug member are arranged around the plug member movably in a first radial direction substantially orthogonal to the opposed second radial direction of the slide portions and are allowed to diametrically expand and diametrically contract in the second radial direction, and
a drive arrangement drives the slide portions to diametrically expand in the second radial direction and to press against a peripheral surface of the positioning hole, wherein the slide portions are moved in the first radial direction with respect to the plug member.

10. The positioning apparatus as set forth in claim 9, wherein
inclined outer surfaces which get closer to an axis of the plug member toward a leading end and oppose each other in the second radial direction are formed on the plug member,
a cylindrical connecting member is arranged around an outer periphery of the plug member,
the slide portions are supported on the connecting member movably in the second radial direction, and are allowed to make a tapering engagement with the inclined outer surfaces from the leading end side,
a drive member is inserted into the plug member axially movably, and the drive member is connected to the connecting member,
the drive member moves the slide portions toward a base end for locking to expand the slide portions in the second radial direction by the tapering engagement of the slide portions and the inclined outer surfaces to bring the slide portions into close contact with an inner peripheral surface of the positioning hole, and
the drive member also moves the slide portions toward the leading end for releasing to cancel the expanded condition of the slide portions and cancel the closely contacted condition of the slide portions.

11. The positioning apparatus as set forth in claim 10, wherein
an urging member is provided, which applies resilient force against the slide portions in a diametrically contracting direction.

12. The positioning apparatus as set forth in claim 9, wherein
two contact portions and an escape portion arranged between the two contact portions are formed on an outer surface of each of the slide portions circumferentially side by side, and
when the contact portions come into contact with an inner peripheral surface of the positioning hole, a gap is formed between the escape portion and the inner peripheral surface of the positioning hole.

13. A clamping system, wherein
the positioning apparatus as set forth in claim 1 or claim 9 is provided to releasably clamp the second block to the first block.

14. A clamping system, wherein
a plurality of positioning apparatuses are provided and at least one of them is the positioning apparatus as set forth in claim 1 or claim 9.

* * * * *